No. 792,189. PATENTED JUNE 13, 1905.
W. L. BANKS.
IRRIGATING IMPLEMENT.
APPLICATION FILED JULY 27, 1904.
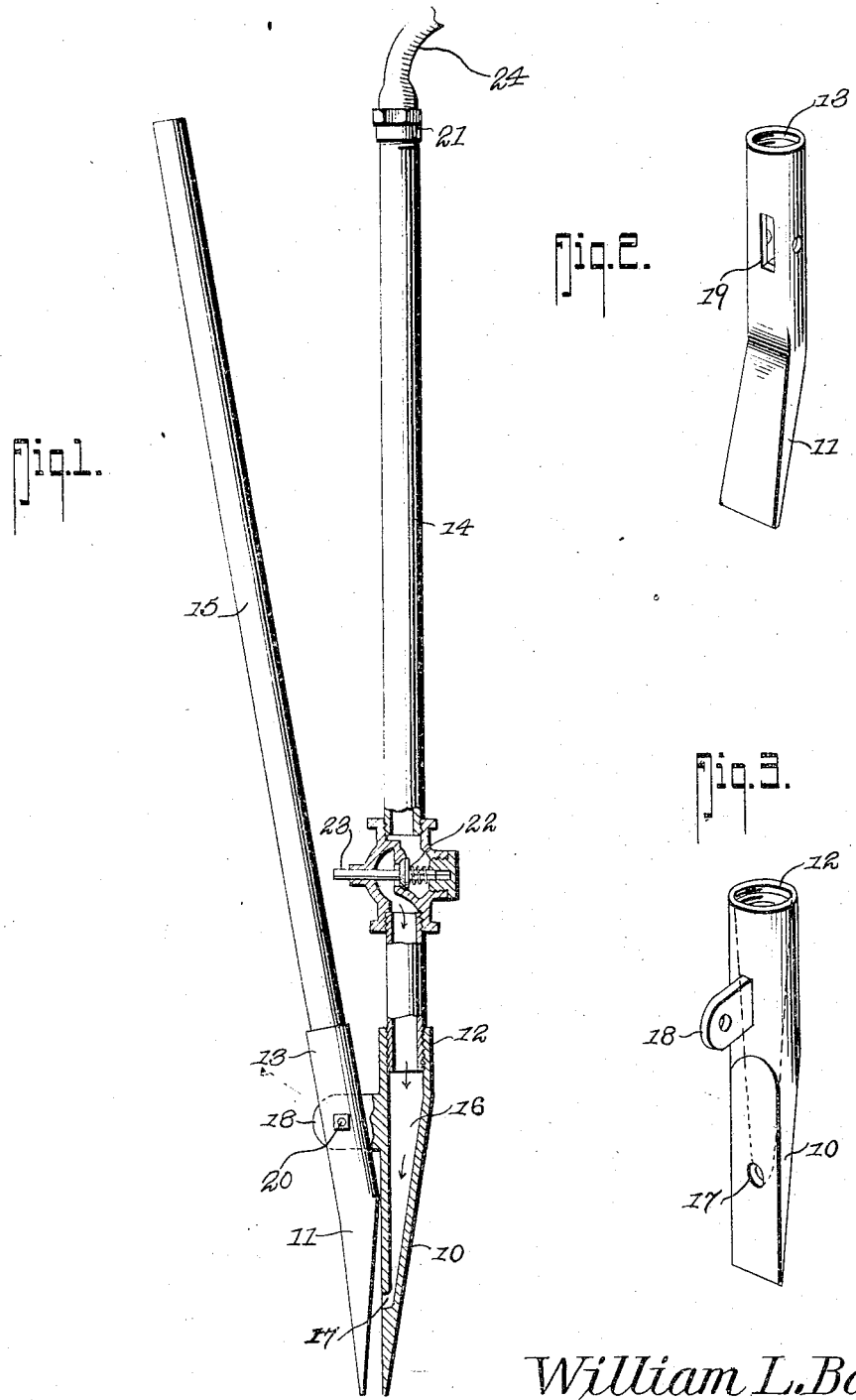
Witnesses
E. F. Stewart
E. N. Woodward
William L. Banks,
Inventor
by C. A. Snow & Co
Attorneys No. 792,189. Patented June 13, 1905.

UNITED STATES PATENT OFFICE.

WILLIAM L. BANKS, OF CORPUS CHRISTI, TEXAS, ASSIGNOR OF ONE-HALF TO WILLIAM W. JOHNSON, OF MEMPHIS, TENNESSEE.

IRRIGATING IMPLEMENT.

SPECIFICATION forming part of Letters Patent No. 792,189, dated June 13, 1905.

Application filed July 27, 1904. Serial No. 218,404.

*To all whom it may concern:*

Be it known that I, WILLIAM L. BANKS, a citizen of the United States, residing at Corpus Christi, in the county of Nueces and State of Texas, have invented a new and useful Irrigating Implement, of which the following is a specification.

This invention relates to certain improvements in irrigating implements of the class wherein a limited amount of the irrigating or fertilizing material is deposited beneath the surface of the ground and among the roots of the plants, and has for its object materially to improve the construction, increase the efficiency, decrease the labor necessary to operate the same, and economize in the amount of material necessary to be employed to accomplish the desired results.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a side elevation, partly in section, of the improved device applied. Figs. 2 and 3 are perspective views of the combined earth-opening and fluid-conductor portions of the device detached.

The improved implement comprises an earth-opening portion formed of two spade-like plates 10 11, having laterally-extended lower ends and contracted and internally-threaded upper ends, as at 12 13, to receive handle members 14 15, the handle member 14 being tubular and communicating with a conduit 16 within the plate 10 and opening through its side, as at 17, next the adjacent face of the plate 11, so that when the two plates are closed the discharge from the conduit will be closed to prevent the entrance of the earth when the implement is thrust into the ground. The handle member 15 and plate 11 may also be tubular, if preferred, to reduce the weight.

The opener-plate 10 is provided with an ear 18 to pass through an aperture 19 in the plate 11 and in which it is pivoted by a bolt 20 to permit the two plates to swing apart by their free spade-like ends.

The material to be employed as an irrigating or fertilizing agent is supplied to the tubular handle member 14, as by a hose 24, suitably coupled thereto, as at 21, and to prevent waste of the material a spring-closed valve 22 is provided in the handle member 14 and disposed for opening by the contact of the handle member 15 with its stem 23 when the latter is closed against the handle member 14 in the act of opening the plate members 10 11. By this arrangement so long as the handle members remain opened or separated the valve 22 will remain closed and shut off the flow of the material.

When the implement is to be used, the spade-like plates 10 11 in their closed position are thrust into the ground where the material is to be supplied and the handle members forced toward each other, thereby opening the lower and broader ends of the plates and forming a relatively large cavity beneath the ground and at the same time opening the valve 22, with the consequent release of the liquid, which will continue to flow as long as the handle members are retained in their closed position. The moment, however, that the implement is withdrawn and the handles opened the valve will be automatically closed by its spring and the flow of liquid shut off, so that no waste of the valuable material occurs. The material is thus deposited only when the implement is actually in the ground in position to accomplish the greatest benefit and the material automatically cut off when not required.

The implement will be found especially valuable for supplying fertilizer or irrigating liquid to the roots of trees and plants having large roots, as the spade-like plates can be thrust in among or between the roots and the earth and roots loosened to permit the flow as long as required, as before mentioned.

The implement is simple in construction, efficient in action, and will be found very useful for the purposes described.

Having thus described the invention, what is claimed is—

An implement of the class described comprising two wedge-shaped earth-opening members, one of which is hollow and has an escape-orifice normally closed by the other member, a handle carried by each of the members, that connected with the orificed member being tubular, a valve carried by the latter member and having a stem disposed in the path of movement of the other handle, one of the members being provided with an aperture and the other with an ear to engage the orifice, and a bolt passing through the apertured member and the ear to hold the two members pivotally connected.

In testimony that I claim the foregoing as my own I have hereto affixed my signature in the presence of two witnesses.

WILLIAM L. BANKS.

Witnesses:
  LEE RIGGS,
  PAT. WHELAN.